United States Patent [19]
Robert

[11] 3,928,588

[45] Dec. 23, 1975

[54] METHOD OF REDUCING THE UNDESIRABLE GASTROINTESTINAL EFFECTS OF PROSTAGLANDIN SYNTHETASE INHIBITORS

[75] Inventor: André Robert, Kalamazoo, Mich.

[73] Assignee: The Upjohn Company, Kalamazoo, Mich.

[22] Filed: Feb. 22, 1974

[21] Appl. No.: 446,197

[52] U.S. Cl. ............... 424/234; 424/273; 424/274; 424/305; 424/317; 424/318
[51] Int. Cl.² ........................................ A61K 31/61
[58] Field of Search .................... 424/305, 318, 234

[56] References Cited
UNITED STATES PATENTS
3,781,429   12/1973   Partridge et al. ................... 424/318

*Primary Examiner*—Norman A. Drezin
*Attorney, Agent, or Firm*—Bruce Stein; Earl C. Spaeth

[57] ABSTRACT

There is disclosed concomitant systemic administration of prostaglandins of the PGF β-type, for example, PGF$_2$ $\beta$, and a prostaglandin synthetase inhibitor, for example, indomethacin, aspirin, or phenylbutazone, to mammals, including humans. Thereby the undesirable gastrointestinal effects of the synthetase inhibitor are reduced.

8 Claims, No Drawings

METHOD OF REDUCING THE UNDESIRABLE GASTROINTESTINAL EFFECTS OF PROSTAGLANDIN SYNTHETASE INHIBITORS

This invention relates to an improvement in a known process of administration of certain medicinal agents to mammals, including humans, to accomplish a desired medicinal result. In particular, this invention relates to an improvement in the process of systemic administration of a prostaglandin synthetase inhibitor to a mammal, said improvement comprising concomitant systemic administration of an amount of a prostaglandin of the PGF$_\beta$ -type effective to reduce the undesirable gastrointestinal effects of said prostaglandin synthetase inhibitor.

According to Takeguchi et al., Prostaglandins, 2, 169 (1972), "Prostaglandin synthetase is a microsomal enzyme complex, which catalyzes the oxidative cyclization of unsaturated $C_{20}$ fatty acids, such as arochidonic acid, into prostaglandins (PG) in the presence of a suitable coenzyme." See also Nugteren et al., Rec. Trav. Chim. Pays-Bas. 85, 405 (1966); Hamberg et al., J. Biol. Chem. 242, 5336 (1967), and Sih et al., J. Am. Chem. Soc. 92, 6670 (1970). This oxidative cyclization is presently thought to be an in vivo physiological process initiated by one or more physiological mechanisms of as yet unknown nature.

In the case of arachidonic acid (1), this oxidative cyclization is formulated as follows, leading to the prostaglandins known as $PGE_2$ (II) and/or $PGF_{2\alpha}$ (III).

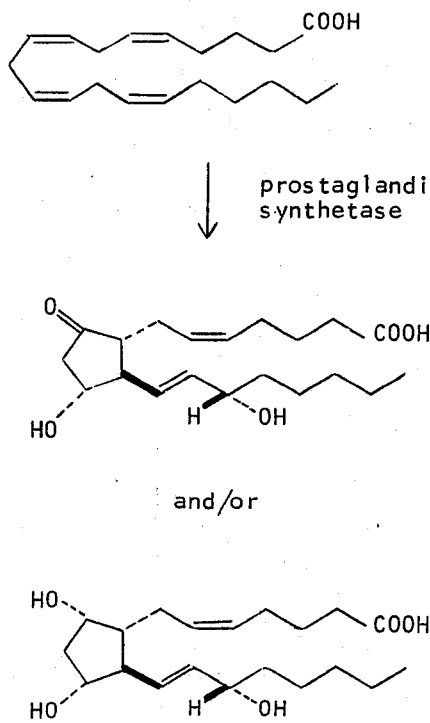

It is now known that certain substances interfere with or inhibit this oxidative cyclization in vitro or in vivo. These substances are referred to broadly as prostaglandin synthetase inhibitors.

It is readily determined in vitro whether or not a particular substance is a prostaglandin synthetase inhibitor. See, for example, Takeguchi et al., above cited.

Many of the substances now known to be prostaglandin synthetase inhibitors are also members of a class known descriptively as non-steroidal anti-inflammatory agents. See, for example, Vane, Nature New Biology, 231, 232 (1971), Takeguchi et al., above cited, and references cited in Takeguchi et al. Included within this class of substances are the well-known anti-inflammatory agents indomethacin, aspirin, and phenylbutazone. Others are mefenamic acid, flufenamic acid, naproxen, 2-phenoxyphenylpropionic acid, (+)-3-chloro-4-cyclohexyl-α-methylphenylacetic acid, and ibuprofen.

It is readily determined in vivo whether or not particular substances, including substances known to be prostaglandin synthetase inhibitors, are anti-inflammatory agents. See, for example, R. A. Turner, "Screening Methods in Pharmacology," Academic Press, New York, Chapter 13, pp. 152–163 (1965), and especially, Winder et al., J. Pharmacol. Exp. Ther. 141, 369 (1963).

It is now well known that administration of certain non-steroidal anti-inflammatory agents, especially by the oral or rectal route, to humans for anti-inflammatory purposes often causes undesirable gastrointestinal effects including but not limited to abdominal pain, single or multiple ulcerations, nodules, adhesions, and other types of lesions, bleeding, anorexia, nausea, and the like. See, for example, Boardman et al., Ann. rheum. Dis. 26, 127 (1967); Taylor et al., Brit. Med J. 4, 734 (1968); Fischer et al., Am. J. Gastroent. 51, 42 (1969); Sturges et al., Am. J. Gastroent, 59, 162 (1973), Chapman et al., Gut, 10, 443 (1909); Smith, Ann. N.Y. Acad. Sci. 86, 38 (1960), and Gault et al., Ann. Int. Med. 68, 906 (1968). Discontinuing administration of the anti-inflammatory agent usually results in alleviation and later substantially complete relief from these undesirable gastrointestinal effects, especially healing of the ulcers. But meanwhile, the patient has no relief from the inflammatory disease for which he was being treated.

It has been reported that the ulcerogenic effect induced by certain non-steroidal anti-inflammatory agents in rats is inhibited by concomitant oral administration of certain prostaglandins of the E and A series, including $PGE_1$, $PGE_2$, $PGE_3$, 13,14-dihydro-$PGE_1$, and the corresponding 11-deoxy-PGE and PGA compounds. See Partridge et al., U.S. Pat. No. 3,781,429.

I have now made the surprising discovery that prostaglandins of the PGF$_\beta$ -type are useful in reducing the undesirable gastrointestinal effects resulting from systemic administration of anti-inflammatory prostaglandin synthetase inhibitors, and are used for that purpose by concomitant administration of the PGF$_\beta$ -type prostaglandin and the anit-inflammatory prostaglandin synthetase inhibitor. This novel process improvement is useful, for example, in reducing the undesirable gastrointestinal effects resulting from systemic administration of indomethacin, phenylbutazone, and aspirin. These are substances specifically mentioned in Partridge et al. as non-steroidal anti-inflammatory agents. But these are also known to be prostaglandin synthetase inhibitors. The novel process improvement of this invention is useful only in reducing undesirable gastrointestinal effects caused by antiflammatory agents which are also prostaglandin synthetase inhibitors. Undersirable gastrointestinal effects caused by antiflammatory agents which are not prostraglandin synthetase inhibitors are not expected to be reduced by concomitant administration of a PGF$_\beta$ -type prostaglandin.

Prostaglandins may be considered as derivatives of a parent substance known as prostanoic acid, having the following formula and atom numbering:

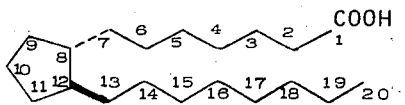

The prostaglandin known as $PGF_{1\beta}$ has the formula:

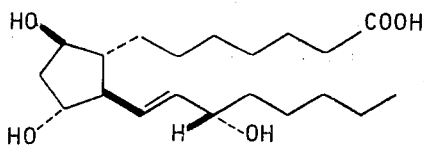

Prostaglandin $F_{2\beta}$ ($PGF_{2\beta}$) has the formula:

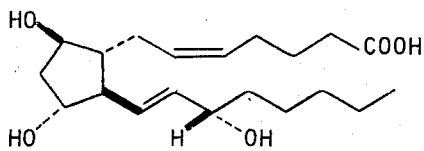

Prostaglandin $F_{3\beta}$ ($PGF_{3\beta}$) has the formula:

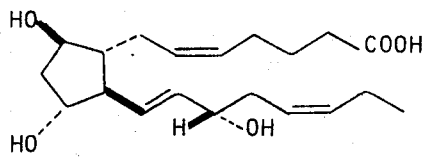

13,14-Dihydroprostaglandin $F_{1\beta}$ (13,14-dihydro-$PGF_{1\beta}$) has the formula:

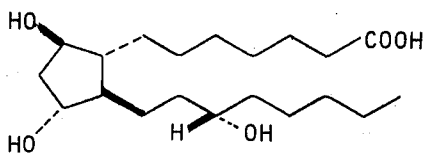

Thus, it can be seen that $PGF_\beta$ -type prostaglandins all have the structural feature:

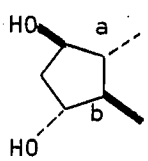

with a carboxyl-terminated carbon chain attached at carbon atom (a) and a carbon chain attached at carbon atom (b), with an alpha (S) hydroxy on the 3rd carbon atom of the latter chain. For the purposes of this invention, a $PGF_\beta$ -type prostaglandin is defined as any compound, optically active or racemic, with the structural features above defined and also with 4 to 9 carbon atoms in a chain between the carboxylate function and the ring at (a) and with 4 to 12 carbon atoms in a chain attached to the ring at (b). The ring and either chain may have substituents, hetero atoms, and/or carbon-carbon double (cis or trans) or triple bonds.

$PGF_{1\beta}$, $PGF_{2\beta}$, $PGF_{3\beta}$, 13,14-dihydro-$PGF_{1\beta}$, and numerous salts and esters of those are known in the art. Moreover, numerous analogs of $PGF_{1\beta}$, $PGF_{2\beta}$, $PGF_{2\beta}$, and 13,14-dihydro-$PGF_{1\beta}$, and salts and esters of those, are known in the art. See, for example, Pharmacol. Rev. 20, 1 (1968) and references cited therein. See also U.S. Pat. Nos. 3,069,322; 3,776,939; 3,706,789; 3,767,695; 3,728,382; 3,657,327; 3,759,978; and 3,775,462. See also German Offenlegungschrift Nos. 1,956,290; 1,937,675; 2,110,938; 2,210,697; 2,036,471; 2,011,969; 2,209,990; 2,154,309; 2,164,184; 2,217,044; 2,221,443; 2,262,608; 2,263,393; 2,320,368; 2,320,552; 2,322,673; and 2,317,019. See also French Pat. No. 2,119,855, Dutch Pat. application No. 7,206,316, and Belgian Pat. Nos. 779,898 and 782,822, these being available in printed form through Derwent CPI accession Nos. 76213T-B, 76383T-B, 59033T-B, and 72340T-B, respectively. See also U.S. Pat. No. 3,296,091; Belgian Pat. Nos. 736,728 and 747,348; Rec. Trav. Chem. 85, 1233 (1966); ibid. 87, 461 (1968); J. Am. Chem. Soc. 90, 5895 (1968); ibid. 91, 5364 (1969); ibid. 91, 5373 (1969); Chem. Communications, 302 (1969); ibid. 602 (1970).

Any of the known $PGF_\beta$ -type free acids, pharmaceutically acceptable salts, and esters as exemplified in the above-cited publications are useful in the novel process improvement of this invention. Moreover, any $PGF_\beta$ -type free acid, pharmaceutically acceptable salt, or ester which is not toxic at the effective dose and which has the structural features defined above is also useful in the novel process improvement of this invention. PGF -type compounds as defined above but having an alkyl substituent rather than hydrogen at C-15, especially methyl or ethyl, and the C-15 hydroxy in beta (R) configuration are also useful in the novel process improvement of this invention when administered orally. These are known in the art. See, for example, U.S. Pat. No. 3,728,382.

The administration to animals and especially to humans of an anti-inflammatory synthetase inhibitor for treatment of inflammation and related physiological condition is not by itself part of this invention. Rather, as discussed above, this invention is an improvement in the administration of anti-inflammatory synthetase inhibitors to mammals and especially to humans.

In order to practice this novel improvement, the anti-inflammatory synthetase inhibitor, for example, indomethacin, aspirin, or phenylbutazone is administered in any of the ways known in the art to alleviate an inflammatory condition, for example, in any dosage regimen and by any of the known routes of systemic administration. It is known, however, that undesirable gastrointestinal effects most often result when the route of administration of the anti-inflammatory substance is oral or rectal, and when relatively large amounts of the substance are administered over a prolonged period of time. It is for such routes of administration and for such dosage regimens that the novel improvement which is this invention is most useful.

The prostaglandin of the PGF$_\beta$ -type is administered along with the anti-inflammatory prostaglandin synthetase inhibitor either by the same route of administration or by a different route. For example, if the anti-inflammatory substance is being administered orally, the PGF$_\beta$ -type prostaglandin is also administered orally or, alternatively, is administered rectally in the form of a suppository or, in the case of women, vaginally in the form of a suppository or a vaginal device for slow release, for example as described in U.S. Pat. No. 3,545,439. Alternatively, if the anti-inflammatory substance is being administered rectally, the PGF$_\beta$ -type prostaglandin is also administered rectally or, alternatively, orally or, in the case of women, vaginally. It is especially convenient when the administration route is to be the same for both anti-inflammatory substance and PGF$_\beta$ -type prostaglandin, to combine both into a single dosage form.

Dosage forms for both the anti-inflammatory substance and the PGF$_\beta$ -type prostaglandin are prepared by methods known in the art. See, for example, Partridge et al., above cited.

Among the PGF$_\beta$ -type prostaglandins to be used according to this invention, PGF$_{2\beta}$ -type compounds are preferred. An especially preferred compound is PGF$_{2\beta}$ (formula VI above). Also especially preferred are PGF$_{1\beta}$ and PGF$_{2\beta}$ analogs wherein the molecular structure is the same as in PGF$_{1\beta}$ or PGF$_{2\beta}$, i.e., formulas V and VI, above, except that there are one or 2 methyl or ethyl groups at C-16 rather than hydrogen, or a methyl or ethyl group at C-15 rather than hydrogen. These are known analogs of PGF$_{1\beta}$ and PGF$_{2\beta}$.

Also preferred among the PGF$_\beta$ -type prostaglandins to be used according to this invention are the free acid form, the salt form wherein the cation is pharmaceutically acceptable, and the ester form wherein the alkyl portion is alkyl, especially alkyl of one to 4 carbon atoms, inclusive, more especially methyl or ethyl. Particularly useful salts are those wherein the cation is derived from tris(hydroxymethyl)aminomethane (THAM).

The dosage regimen for the PGF$_\beta$ -type prostaglandin in accord with this invention will depend upon a variety of factors, including the type, age, weight, sex, and medical condition of the mammal, the nature and dosage regimen of the anti-inflammatory synthetase inhibitor being administered to the mammal, the sensitivity of the particular individual mammal to the particular synthetase inhibitor with regard to gastrointestinal effects, and the particular PGF$_\beta$ -type prostaglandin to be administered. For example, not every human in need of an anti-inflammatory substance experiences the same adverse gastrointestinal effects when taking the substance. The gastrointestinal effects will frequently vary substantially in kind and degree. But it is within the skill of the attending physician or veterinarian to determine that administration of the anti-inflammatory substance is causing undesirable gastrointestinal effects in the human or animal subject and to prescribe an effective amount of the PGF$_\beta$ -type prostaglandin to reduce and then substantially to eliminate those undesirable effects. In doing that, the physician or veterinarian would, of course, start at a relatively low concomitant dose of the PGF$_\beta$ -type prostaglandin, for example, about 0.025 mg./kg./day of PGF$_{2\beta}$ or about 2.5 μg/kg./day of 15-methyl-PGF$_{2\beta}$ and observe the response of the human or animal patient for a few days. The dose of the PGF$_\beta$ -type prostaglandin is then adjusted downward or upward until the minimum effective dose is found. For example, in the case of PGF$_{2\beta}$, the maximum needed dose is usually about 25 mg./kg./day and in the case of 15-methyl-PGF$_{2\beta}$ the maximum needed dose is usually about 75 μg/kg./day, although it may be necessary occasionally to exceed these doses when large amounts of the inflammatory substance are needed for a particular medical indication or when the gastrointestinal response of a particular subject to the anti-inflammatory substance is especially severe and there is a sound medical reason for maintaining the subject on that particular anti-inflammatory substance. Once the minimum effective dose of the particular PGF$_\beta$ -type compound is determined for a particular subject, it is advantageous to provide the subject with a single dosage form which contains both the desired amount of the anti-inflammatory substance and the amount of the PGF$_\beta$ -type prostaglandin effective to obtain the desired gastrointestinal result.

Since not all animal and human subjects have adverse gastrointestinal responses to administration of an anti-inflammatory prostaglandin synthetase inhibitor, rational medical therapy indicates that the PGF$_\beta$ -type compound not be administered until the need for that appears in any particular animal or humam subject. But when this need is observed, it can be expected that, at least in some subjects, a higher dose level of the PGF$_\beta$ -type compound will be needed along with the anti-inflammatory substance to allow the gastrointestinal tract to return to normal during continued administration of the anti-inflammatory substance than will later be necessary to maintain a normal gastrointestinal tract. It is, however, within the skill of the attending physician or veterinarian to adjust the dose of the PGF$_\beta$ -type substance to meet the needs of the individual human or animal subject especially in the usual situations involving long term regimens of anti-inflammatory substances. In this respect, the term "effective amount" of the PGF$_\beta$ -type substance will mean amounts effective at various time periods during administration of an anti-inflammatory substance. An amount of the PGF$_\beta$ -type substance effective to allow healing of existing gastrointestinal ulcers, for example, will not necessarily be the same and, indeed, is likely to be more than the amount effective to avoid formation of future ulcers. The process improvement which is this invention includes both of these concepts of "effective amount".

I claim:

1. A method of reducing undesirable gastrointestinal effects caused by an anti-inflammatory prostaglandin synthetase inhibitor in a human suffering therefrom, which comprises the concomitant systemic administration with the anti-inflammatory prostaglandin synthetase inhibitor of a prostaglandin of the PGF$_\beta$ -type, or an alkyl ester containing from one to 4 carbon atoms, inclusive, or a pharmaceutically acceptable salt thereof in an amount effective to reduce the undesirable gastrointestinal effects of the anti-inflammatory prostaglandin synthetase inhibitor.

2. A method of reducing undesirable gastrointestinal effects caused by an anti-inflammatory prostaglandin synthetase inhibitor in a human suffering therefrom, which comprises the concomitant systemic administration with the anti-inflammatory prostaglandin synthetase inhibitor of a prostaglandin of the PGF$_{2\beta}$ -type, or an alkyl ester containing from one to 4 carbon atoms, inclusive, or a pharmaceutically acceptable salt thereof in an amount effective to reduce the undesirable gastrointestinal effects of the anti-inflammatory prostaglandin synthetase inhibitor.

3. A method of reducing undesirable gastrointestinal effects caused by an anti-inflammatory prostaglandin synthetase inhibitor in a human suffering therefrom, which comprises concomitant systemic administration with the anti-inflammatory prostaglandin synthetase inhibitor of 15(R)-15-methyl-PGF$_{2\beta}$ or an alkyl ester containing from one to 4 carbon atoms, inclusive, or a pharmaceutically acceptable salt thereof in an amount effective to reduce the undesirable gastrointestinal effects of the anti-inflammatory prostaglandin synthetase inhibitor.

4. A method of reducing undesirable gastrointestinal effects caused by an anti-inflammatory prostaglandin synthetase inhibitor in a human suffering therefrom, which comprises concomitant systemic administration with the anti-inflammatory prostaglandin synthetase inhibitor of 15(S)-15-methyl-PGF$_{2\beta}$ or an alkyl ester containing from one to 4 carbon atoms, inclusive, or a pharmaceutically acceptable salt thereof in an amount effective to reduce the undesirable gastrointestinal effects of the anti-inflammatory prostaglandin synthetase inhibitor.

5. A method of reducing undesirable gastrointestinal effects caused by an anti-inflammatory prostaglandin synthetase inhibitor in a human suffering therefrom, selected from the group consisting of indomethacin, phenylbutazone, aspirin, mefenamic acid, flufenamic acid, naproxen, 2-phenoxyphenylpropionic acid, (+)-3-chloro-4-cyclohexyl-$\alpha$-methylphenylacetic acid and ibuprofen, which comprises the concomitant systemic administration with the anti-inflammatory prostaglandin synthetase inhibitor of a prostaglandin of the PGF$_\beta$ -type or an alkyl ester containing from one to 4 carbon atoms, inclusive, or a pharmaceutically acceptable salt thereof in an amount effective to reduce the undesirable gastrointestinal effects of the anti-inflammatory prostaglandin synthetase inhibitor.

6. A method of reducing undesirable gastrointestinal effects caused by an anti-inflammatory prostaglandin synthetase inhibitor in a human suffering therefrom, selected from the group consisting of indomethacin, phenylbutazone, aspirin, mefenamic acid, flufenamic acid, naproxen, 2-phenoxyphenylpropionic acid, (+)-3-chloro-4-cyclohexyl-$\alpha$-methylphenylacetic acid and ibuprofen, which comprises the concomitant systemic administration with the anti-inflammatory prostaglandin synthetase inhibitor of a prostaglandin of the PGF$_{2\beta}$ -type or an alkyl ester containing from one to 4 carbon atoms, inclusive, or a pharmaceutically acceptable salt thereof in an amount effective to reduce the undesirable gastrointestinal effects of the anti-inflammatory prostaglandin synthetase inhibitor.

7. A method of reducing undesirable gastrointestinal effects caused by an anti-inflammatory prostaglandin synthetase inhibitor in a human suffering therefrom, selected from the group consisting of indomethacin, phenylbutazone, aspirin, mefenamic acid, flufenamic acid, naproxen, 2-phenoxyphenylpropionic acid, (+)-3-chloro-4-cyclohexyl-$\alpha$-methylphenylacetic acid and ibuprofen, which comprises the concomitant systemic administration with the anti-inflammatory prostaglandin synthetase inhibitor of 15(R)-15-methyl-PGF$_{2\beta}$ or an alkyl ester containing from one to 4 carbon atoms, inclusive, or a pharmaceutically acceptable salt thereof in an amount effective to reduce the undesirable gastrointestinal effects of the anti-inflammatory prostaglandin synthetase inhibitor.

8. A method of reducing undesirable gastrointestinal effects caused by an anti-inflammatory prostaglandin synthetase inhibitor in a human suffering therefrom, selected from the group consisting of indomethacin, phenylbutazone, aspirin, mefenamic acid, flufenamic acid, naproxen, 2-phenoxyphenylpropionic acid, (+)-3-chloro-4-cyclohexyl-$\alpha$-methylphenylacetic acid and ibuprofen, which comprises the concomitant systemic administration with the anti-inflammatory prostaglandin synthetase inhibitor of 15(S)-15-methyl-PGF$_{2\beta}$ or an alkyl ester containing from one to 4 carbon atoms, inclusive, or a pharmaceutically acceptable salt thereof in an amount effective to reduce the undesirable gastrointestinal effects of the anti-inflammatory prostaglandin synthetase inhibitor.

* * * * *